E. D. ROY.
ROCK SHAFT BEARING.
APPLICATION FILED MAR. 28, 1917.
1,234,808.
Patented July 31, 1917.
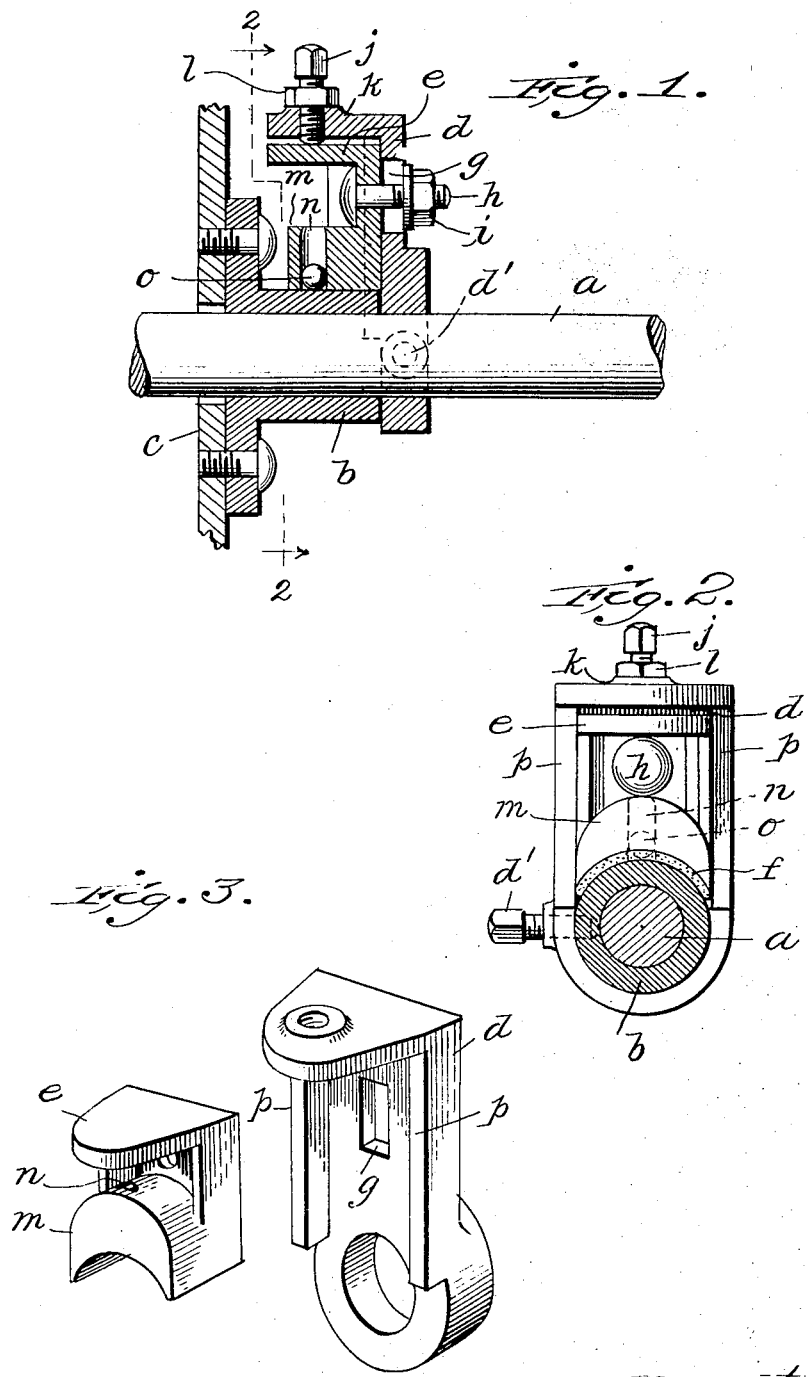
Inventor.
Edward D. Roy
By Davis & Davis
Attorneys

UNITED STATES PATENT OFFICE.

EDWARD D. ROY, OF GREENVILLE, SOUTH CAROLINA.

ROCK-SHAFT BEARING.

1,234,808.     Specification of Letters Patent.     Patented July 31, 1917.

Application filed March 28, 1917. Serial No. 157,959.

*To all whom it may concern:*

Be it known that I, EDWARD D. ROY, a citizen of the United States of America, and a resident of Greenville, county of Greenville, State of South Carolina, have invented certain new and useful Improvements in Rock-Shaft Bearings, of which the following is a full and clear specification.

In rock shafts for looms and other machinery, the portions of the shafts which rest in the bearings soon become worn, thus necessitating the substitution of a new shaft. It is the object of this invention to relieve the shaft of practically all wear at the bearings and transfer the wear to members which may be readily removed and renewed at slight expense, thus saving the cost of renewing the shaft itself.

In the drawing—

Figure 1 is a vertical longitudinal sectional view showing my device applied to one of the bearings of a loom rock shaft;

Fig. 2 is a vertical sectional view on the line 2—2 of Fig. 1; and

Fig. 3 is a perspective view of the parts of my device separated from each other.

In the drawing annexed, $a$ designates a shaft which may be the well known rocker shaft used in Crompton and Knowles or other looms and which extends through the usual tubular bearing $b$ affixed in the usual manner to the frame $c$ of the loom or other machine. It is usual to mount the shaft in two of these bearings $b$, one at either side of the machine, but I have shown but one of these bearings in my drawing.

Affixed to the shaft by a set-screw $d'$ adjacent to the inner end of each of the bearings $b$, is an upstanding arm $d$, and affixed to the inner face of the outer end of the arm $d$ is a supporting member $e$, whose under surface is curved to fit down over the cylindrical upper surface of the usual hub part of the bearing $b$. The shaft extends loosely through the bearing $b$ and is supported entirely by the member $e$ bearing upon the hub or cylindrical portion of the stationary bearing $b$, so that the wear incident to rocking the shaft will take place entirely on the contacting faces of the parts $e$ and $b$. To reduce the wear to a minimum on the cylindrical hub $b$ and to transfer it entirely to the supporting member $e$, I may of course affix to the wearing face of member $e$ a suitable wear plate or leather and make the same detachable for renewal purposes, as shown at $f$ in Fig. 2.

The supporting member $e$ is mounted on the arm $d$ in such manner as to be readily adjusted with respect to the shaft, so as to nicely adjust the parts to take the weight of the shaft off the bearing $b$. I show for this purpose a slot $g$ in the arm $d$ and bolt $h$ carried by the member $e$, the threaded end of said bolt extending through the slot and being provided with a clamp nut $i$. I further provide an adjusting screw $j$ in a lateral ear $k$ formed on the outer end of the arm $d$, this adjusting screw being adapted to bear on the outer end of the member $e$, a suitable lock nut $l$ being mounted on the screw. In the curved foot piece $m$ of the supporting member $e$, I provide a radial oil pocket $n$ leading to the bearing face of this foot piece for convenience in oiling the contacting faces. This oil pocket is cylindrical in shape and to assist in feeding the oil from it to the contacting faces of the parts, I drop a ball into the passage, this ball being approximately the diameter of the passage and arranged to gravitatingly rest upon the curved bearing face of the hub $b$. The rocking of the shaft and the supporting member $e$ will cause the ball to rotate and thus cause the oil to be fed to the contacting faces of the parts. The outer end of the oil passage $n$ is slightly constricted to prevent accidental displacement of the ball by jarring.

It will be observed also that the supporting member $e$ is readily guided on the arm $d$ by means of flanges $p$ formed on the side edges of the arm.

The nature and scope of the invention having been thus indicated and its preferred embodiment having been specifically described, what is claimed as new is:

1. In combination, a rock shaft, a stationary cylindrical member through which the rock shaft extends, an arm affixed to the rock shaft adjacent said cylindrical member, and a supporting member affixed to said arm and shaped to fit down upon said cylindrical member, for the purpose set forth.

2. The structure recited in claim 1, means being provided for radially adjusting the supporting member with respect to the shaft.

3. The structure recited in claim 1, the supporting member being provided with a lubricating passage leading to the contacting faces of the said supporting member and the cylindrical member.

4. The structure recited in claim 3, said lubricating passage being closed at its inner end by a rolling element which gravitatingly bears upon the cylindrical member.

In testimony whereof I hereunto affix my signature.

EDWARD D. ROY.

Witnesses:
HARRY B. KILGORE,
W. B. PERRIN.